US012673490B2

(12) United States Patent
Miyazaki

(10) Patent No.: US 12,673,490 B2
(45) Date of Patent: Jul. 7, 2026

(54) LIQUID DISCHARGE HEAD AND LIQUID DISCHARGE APPARATUS

(71) Applicant: Takeshi Miyazaki, Kanagawa (JP)

(72) Inventor: Takeshi Miyazaki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 173 days.

(21) Appl. No.: 18/599,299

(22) Filed: Mar. 8, 2024

(65) Prior Publication Data

US 2024/0326413 A1 Oct. 3, 2024

(30) Foreign Application Priority Data

Mar. 27, 2023 (JP) ................................ 2023-049302

(51) Int. Cl.
*B41J 2/045* (2006.01)
*B41J 2/14* (2006.01)

(52) U.S. Cl.
CPC ....... *B41J 2/04581* (2013.01); *B41J 2/14201* (2013.01); *B41J 2/1433* (2013.01); *B41J 2002/14338* (2013.01); *B41J 2002/14491* (2013.01); *B41J 2202/02* (2013.01)

(58) Field of Classification Search
CPC .. B41J 2/04581; B41J 2/14201; B41J 2/1433; B41J 2002/14338; B41J 2002/14491; B41J 2202/02
See application file for complete search history.

(56) References Cited

U.S. PATENT DOCUMENTS

2002/0001017 A1* 1/2002 Kikuchi ................ B41J 2/1433 347/47
2015/0266295 A1 9/2015 Miyazaki
2017/0106650 A1 4/2017 Miyazaki
2019/0263157 A1 8/2019 Miyazaki
2019/0283420 A1 9/2019 Kida
2020/0031148 A1 1/2020 Miyazaki
2020/0298567 A1 9/2020 Miyazaki
(Continued)

FOREIGN PATENT DOCUMENTS

JP 2018-202875 A 12/2018
JP 2019-162857 A 9/2019
(Continued)

*Primary Examiner* — Jason S Uhlenhake
(74) *Attorney, Agent, or Firm* — XSENSUS LLP

(57) ABSTRACT

A liquid discharge head includes a nozzle plate having multiple nozzles from which a liquid is dischargeable in a discharge direction, the multiple nozzles arrayed in a nozzle array direction; an individual channel member including individual channels respectively communicating with the multiple nozzles; multiple pressure generators to generate pressure to discharge the liquid from the multiple nozzles, respectively; a wiring member including a drive circuit; a protector adjacent to at least one side of the nozzle plate in a direction perpendicular to the discharge direction and overlapping the drive circuit of the wiring member in the discharge direction; a housing holding the protector, the nozzle plate, and the individual channel member; and a gas channel. The housing has a gas inlet; and a gas outlet. The gas channel is between the protector and the wiring member and communicates with each of the gas inlet and the gas outlet.

20 Claims, 17 Drawing Sheets

(56) References Cited

U.S. PATENT DOCUMENTS

| | | | | |
|---|---|---|---|---|
| 2021/0001652 | A1 | 1/2021 | Kinokuni et al. | |
| 2023/0134366 | A1* | 5/2023 | Kobayashi | B41J 29/02<br>347/18 |
| 2023/0134389 | A1 | 5/2023 | Miyazaki | |
| 2024/0001673 | A1 | 1/2024 | Miyazaki | |

FOREIGN PATENT DOCUMENTS

| | | | |
|---|---|---|---|
| JP | 2020-015300 | A | 1/2020 |
| JP | 2023-135705 | A | 9/2023 |
| JP | 2024-005168 | A | 1/2024 |
| WO | 2010/099418 | A1 | 9/2010 |

* cited by examiner

LIQUID DISCHARGE HEAD AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2023-049302, filed on Mar. 27, 2023, in the Japan Patent Office, the entire disclosure of which is hereby incorporated by reference herein.

BACKGROUND

Technical Field

Embodiments of the present disclosure relate to a liquid discharge head and a liquid discharge apparatus.

Related Art

In liquid discharge heads that discharge liquid, there exists a design that incorporates a drive circuit (or driver IC) within the head to deliver drive signals to the pressure generator.

SUMMARY

An embodiment of the present disclosure provides a liquid discharge head includes a nozzle plate having multiple nozzles from which a liquid is dischargeable in a discharge direction, the multiple nozzles arrayed in a nozzle array direction; an individual channel member including individual channels respectively communicating with the multiple nozzles; multiple pressure generators to generate pressure to discharge the liquid from the multiple nozzles, respectively; a wiring member including a drive circuit to output a drive signal to each of the multiple pressure generators; a protector adjacent to at least one side of the nozzle plate in a direction perpendicular to the discharge direction and overlapping the drive circuit of the wiring member in the discharge direction; a housing holding the protector, the nozzle plate, and the individual channel member; and a gas channel. The housing has a gas inlet; and a gas outlet. The gas channel is between the protector and the wiring member and communicates with each of the gas inlet and the gas outlet.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
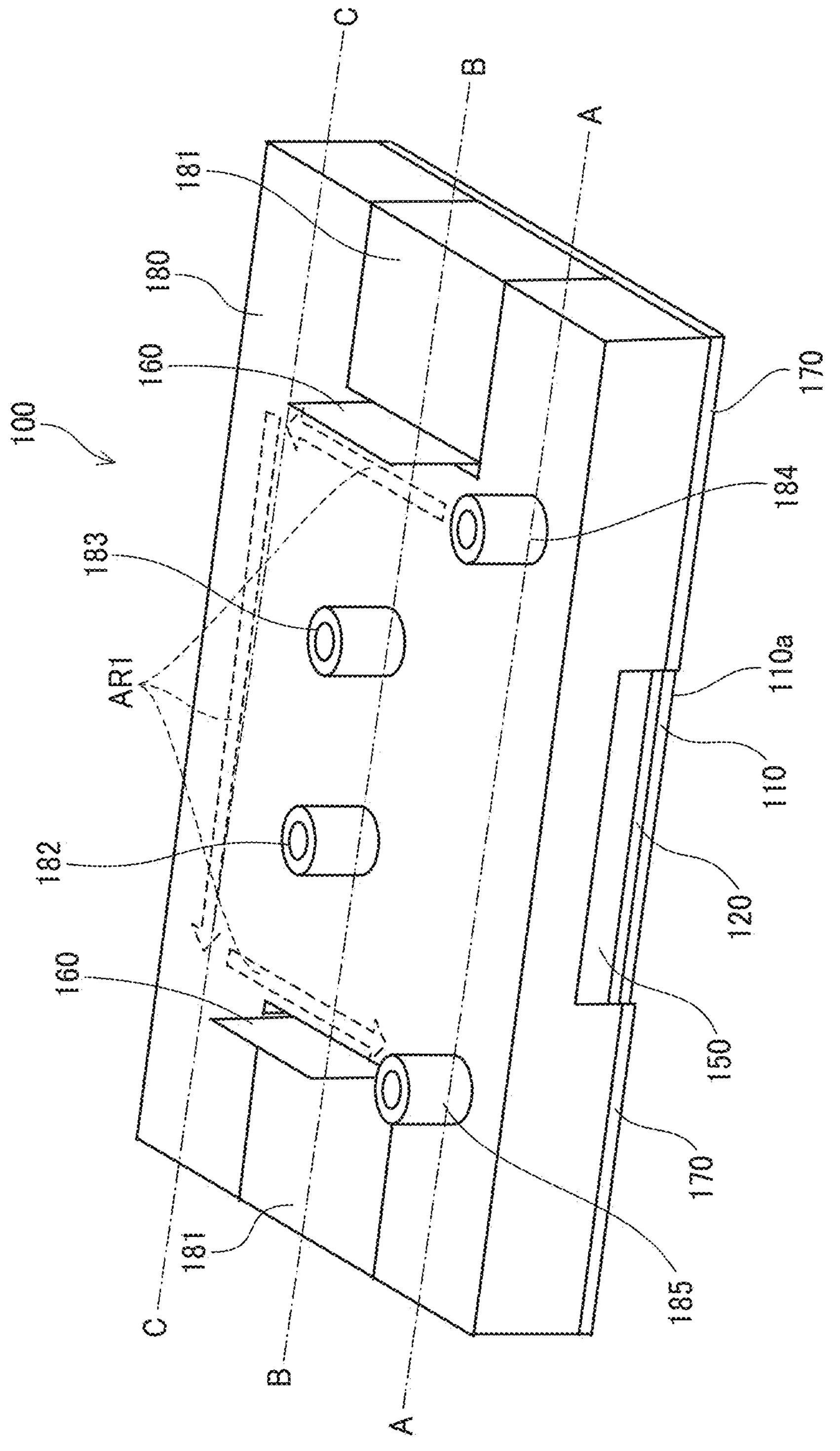
FIG. 1 is a perspective view of a discharge head according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A known liquid discharge head features a structure that includes a rigid wiring board, an integrated circuit on a channel substrate with a pressure chamber, a pressure chamber substrate, and a diaphragm; a storage chamber substrate; and a metal exterior casing. In that structure, the rigid wiring board overlays a piezoelectric element that deforms in accordance with the drive signals. The integrated circuit, on the rigid wiring board, outputs drive signals to the piezoelectric element. The storage chamber substrate is placed on the first member. The external casing is placed on the storage chamber substrate. Additionally, the liquid discharge head has an opening for heat dissipation between the integrated circuit and the external casing to dissipate heat from the integrated circuit.

Mounting the driver IC within the discharge head allows for heat dissipation into the flowing liquids inside. However, excessive heat may alter the viscosity of the liquid being discharged, leading to variations in discharge characteristics.

According to one aspect of the present disclosure, fluctuations in discharge characteristics caused by heat generated within the discharge head can be stabilized.

Figure 2:
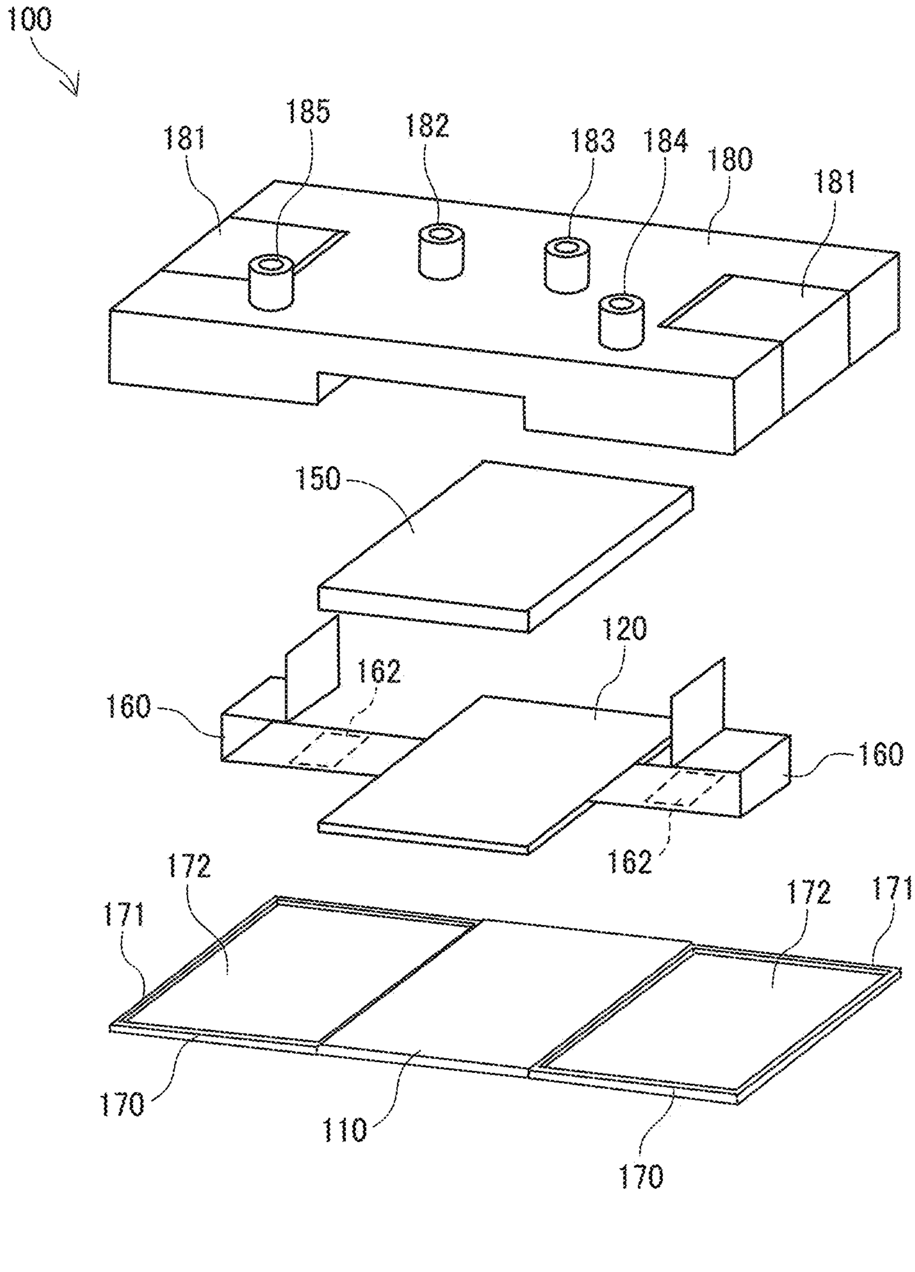
FIG. 2 is an exploded perspective view of the discharge head in FIG. 1 as viewed from its top.
Figure 3:
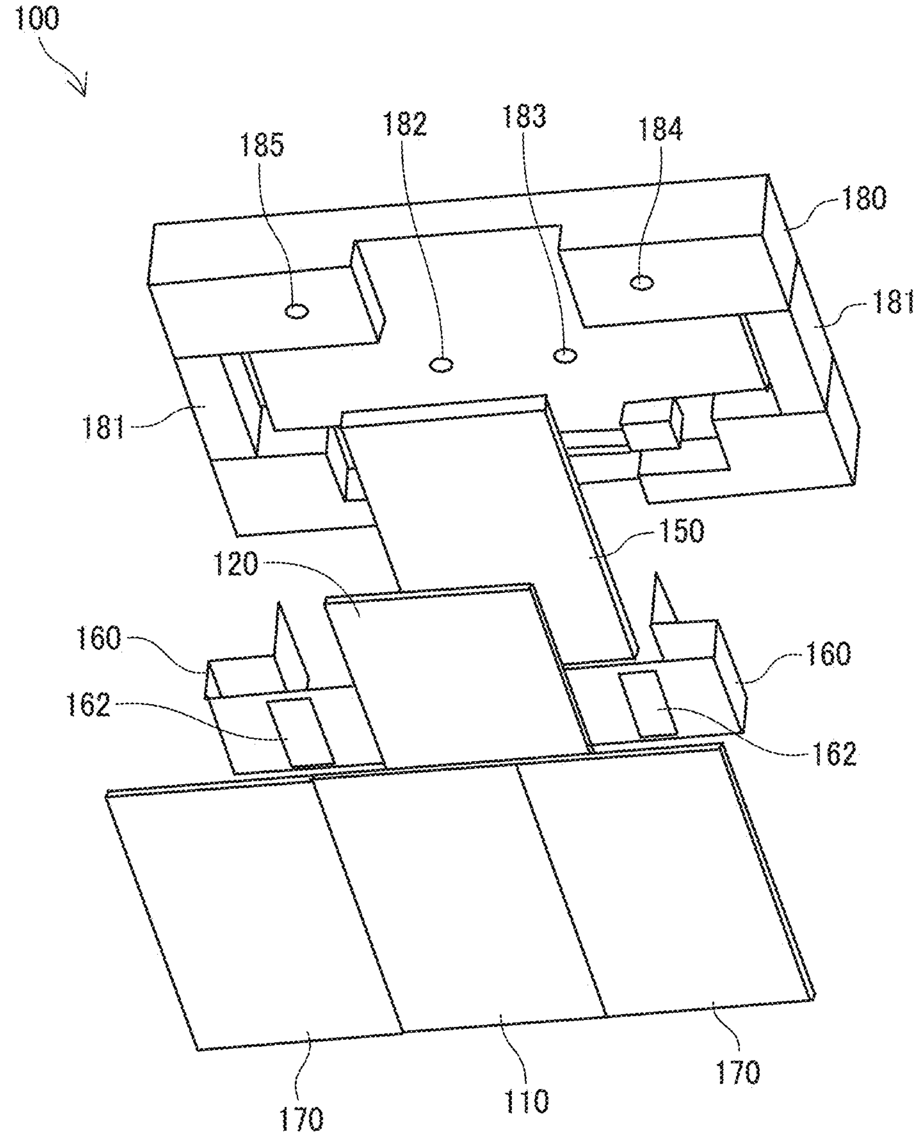
FIG. 3 is an exploded perspective view of the discharge head in FIG. 1 as viewed from its bottom.
Figure 4:
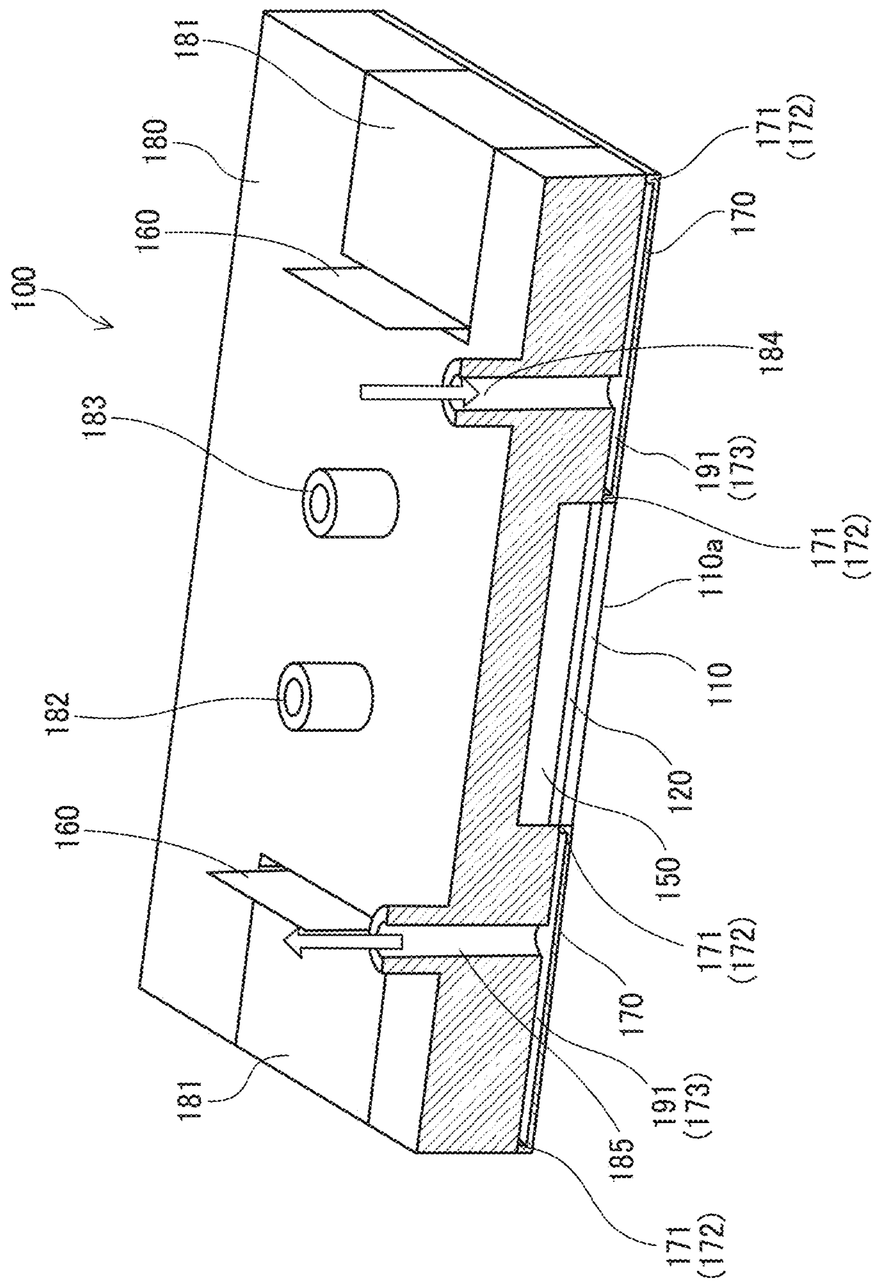
FIG. 4 is an A-A cross-sectional view of the discharge head in FIG. 1.
Figure 5:
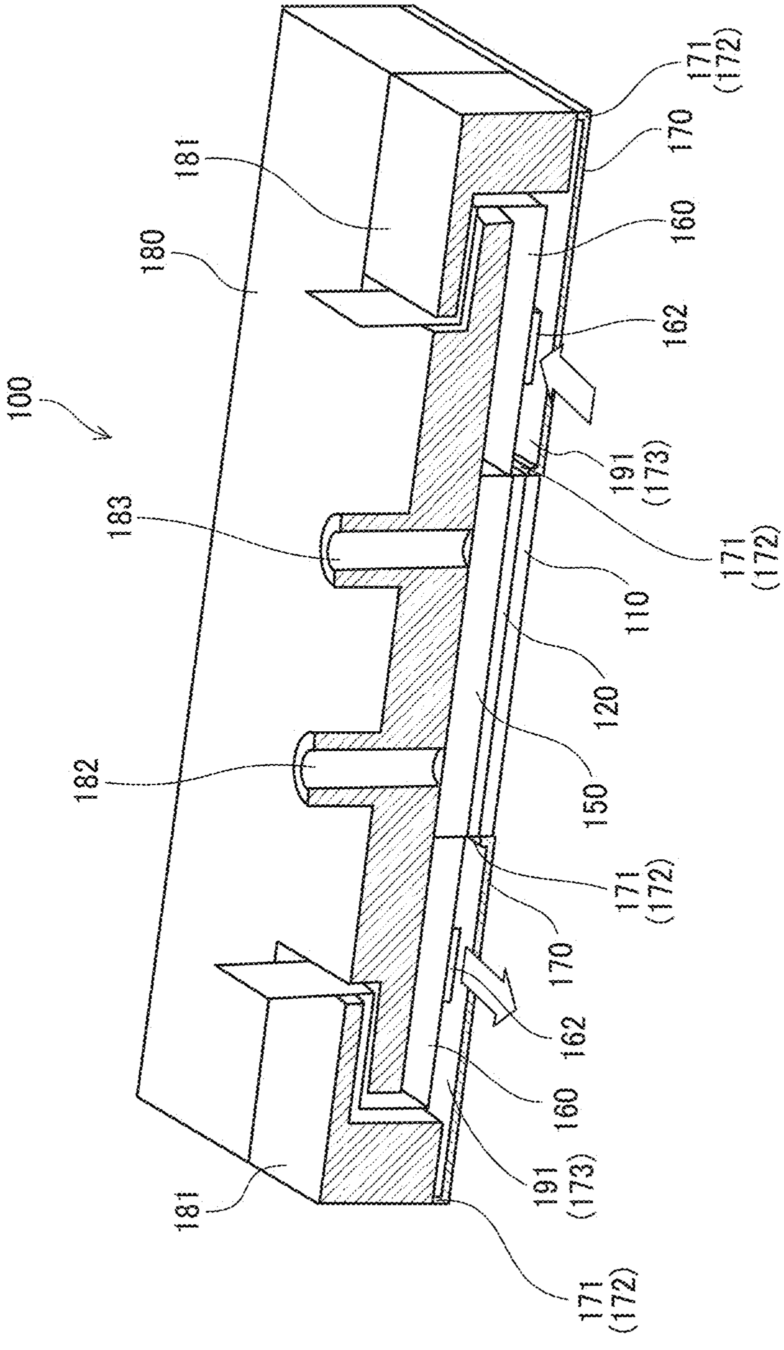
FIG. 5 is a B-B cross-sectional view of the liquid discharge head in FIG. 1.
Figure 6:
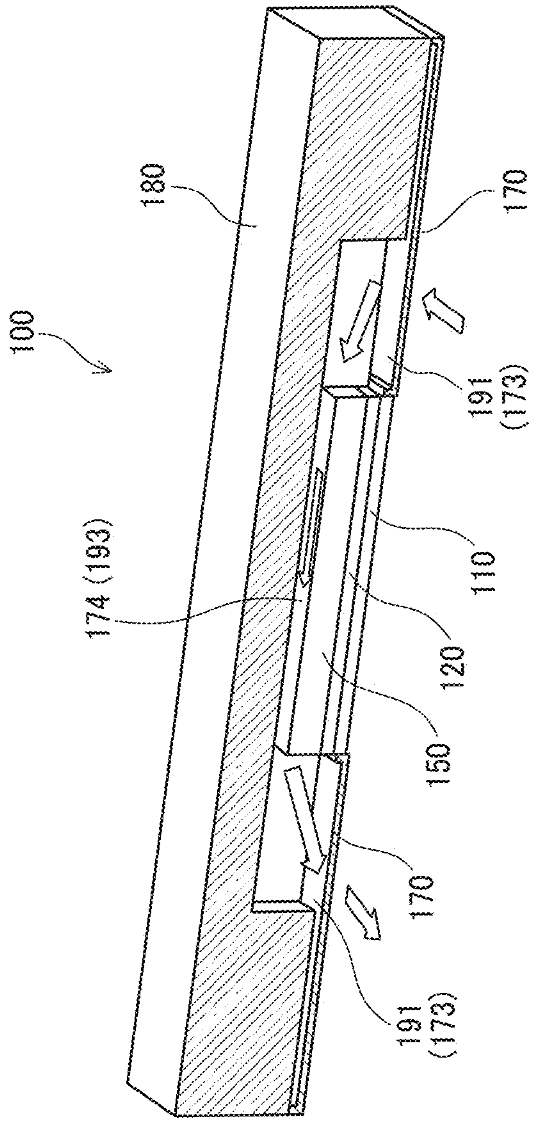
FIG. 6 is a C-C cross-sectional view of the discharge head in FIG. 1.

Embodiments of the present disclosure are described below with reference to the accompanying drawings. A liquid discharge head 100 according to a first embodiment of the present disclosure is described with reference to FIGS. 1 to 6. Hereinafter, the "liquid discharge head" is simply referred to as the "head". FIG. 1 is a perspective view of a discharge head according to a first embodiment of the present disclosure. FIG. 2 is an exploded perspective view of the discharge head in FIG. 1 as viewed from its top. FIG. 3 is an exploded perspective view of the discharge head in FIG. 1 as viewed from its bottom. FIG. 4 is an A-A cross-sectional view of the discharge head in FIG. 1. FIG. 5 is a B-B cross-sectional view of the liquid discharge head in FIG. 1. FIG. 6 is a C-C cross-sectional view of the discharge head in FIG. 1.

A discharge head 100 includes a nozzle plate 110, an individual channel member 120, a common channel 150, a wiring member 160, a protective member 170 (or a protector), and a housing 180. The common channel 150 serves to protect the individual channel member 120.

An example of the liquid discharge head 100 that discharges a liquid is described with reference to FIG. 7.

Figure 7:
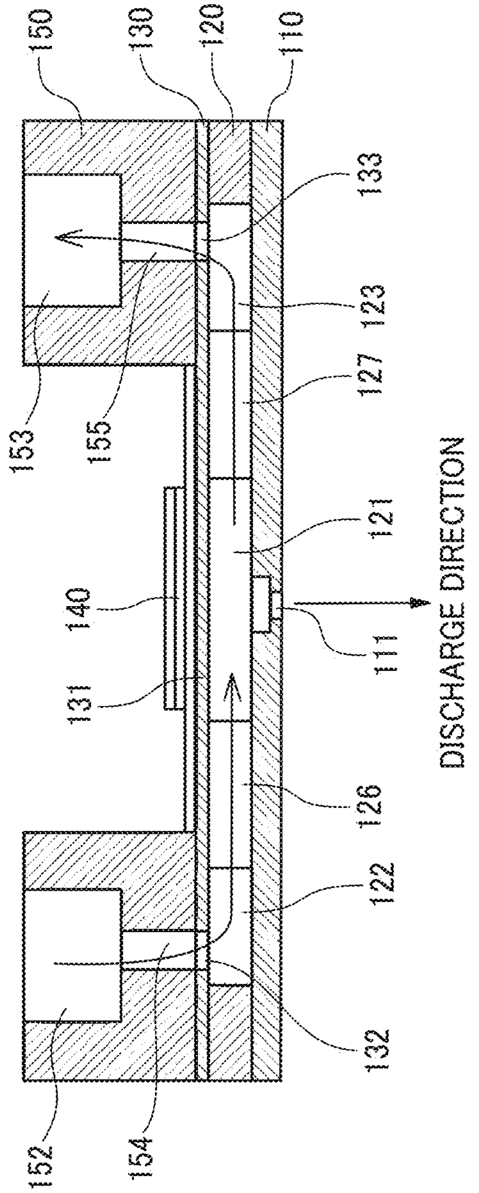
FIG. 7 is a cross-sectional view of a liquid discharge portion of the discharge head in FIG. 7.

FIG. 7 is a cross-sectional view of a liquid discharge portion of the discharge head in FIG. 7.

The nozzle plate 110 has multiple nozzles 111 to discharge liquid. The multiple nozzles 111 are arranged, for example, in a staggered or two-dimensional matrix.

Figure 8:
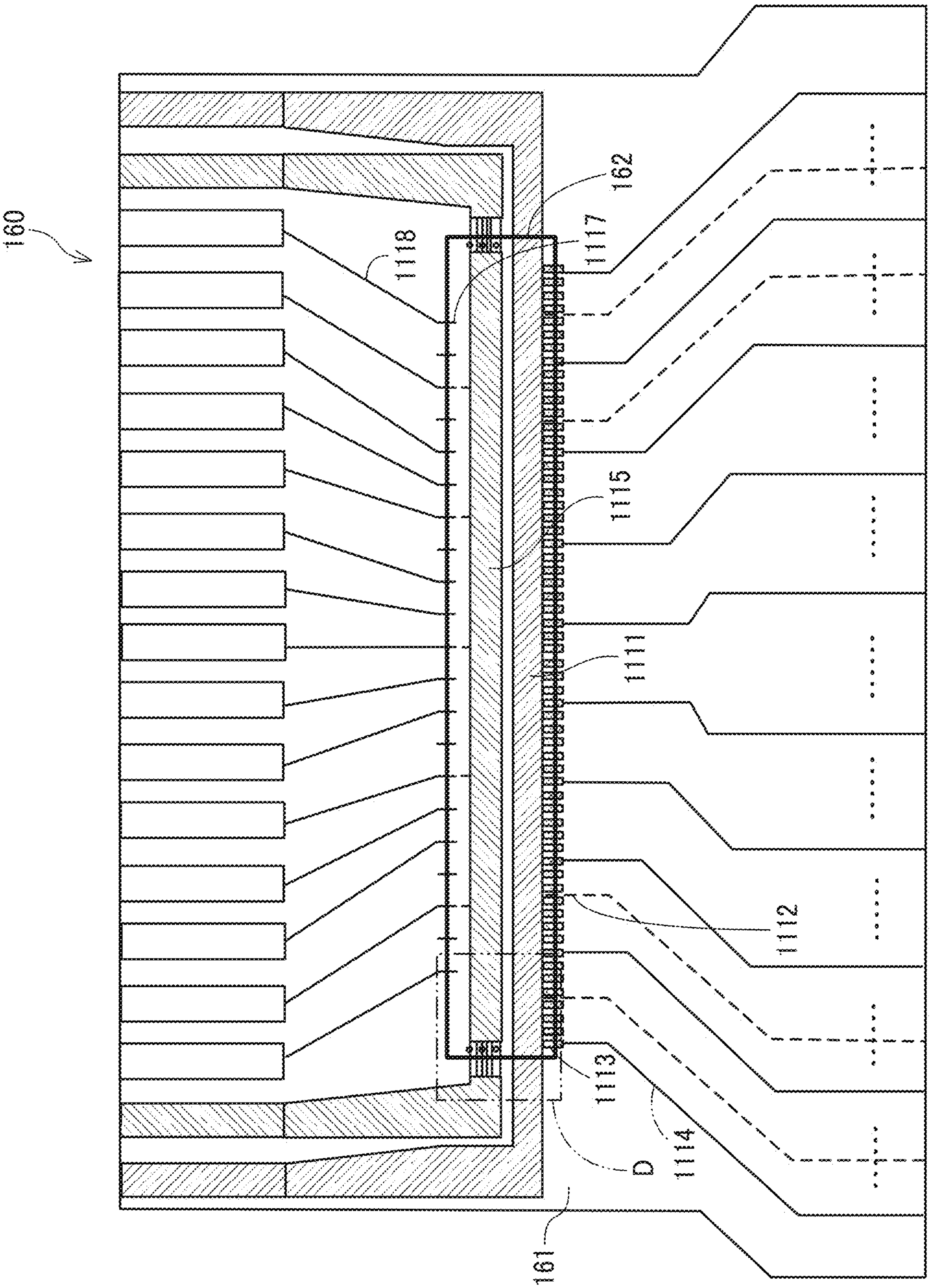
FIG. 8 is a plan view of a wiring component of the discharge head in FIG. 1.

The individual channel member 120 includes multiple pressure chambers 121 (individual chambers) respectively communicating with the multiple nozzles 111, multiple individual supply channels 122 respectively communicating with the multiple pressure chambers 121, and multiple individual collection channels 123 respectively communicating with the multiple pressure chambers 121 (see FIGS. 7 and 8). The individual channel member 120 includes a diaphragm 130 that forms a deformable area 131 of the pressure chamber 121. Multiple piezoelectric elements 140 are positioned on the side opposite to the pressure chamber 121 of the diaphragm 130, closer to the common channel member 150. The multiple piezoelectric elements 140 serve as a pressure generator to generate pressure used to discharge liquids from the multiple nozzles 111.

The common channel member 150 includes multiple common supply channels 152 communicating with multiple individual supply channels 122 and multiple common collection channels 153 communicating with multiple individual collection channels 123. The common channel member 150 has a supply port 154 and a collection port 155 (FIG. 7).

Returning to FIGS. 1 to 6, the wiring member 160 includes a flexible printed circuit (FPC) and a flexible flat cable (FFC), and a driver integrated circuit (IC) 162, including a drive circuit that outputs a driving signal to a piezoelectric element 140, is mounted on the wiring member 160. The driver IC 47 is mounted on the surface of the wiring member 160, which is closer to the protective member 170.

The wiring on the wiring member 160 is connected at the end of the individual channel member 120 to the individual electrode wiring and common electrode wiring of the piezoelectric elements 140, which are extended to the end of the individual channel member 120, and is also connected to the input/output terminals of the driver IC 162.

Figure 9:
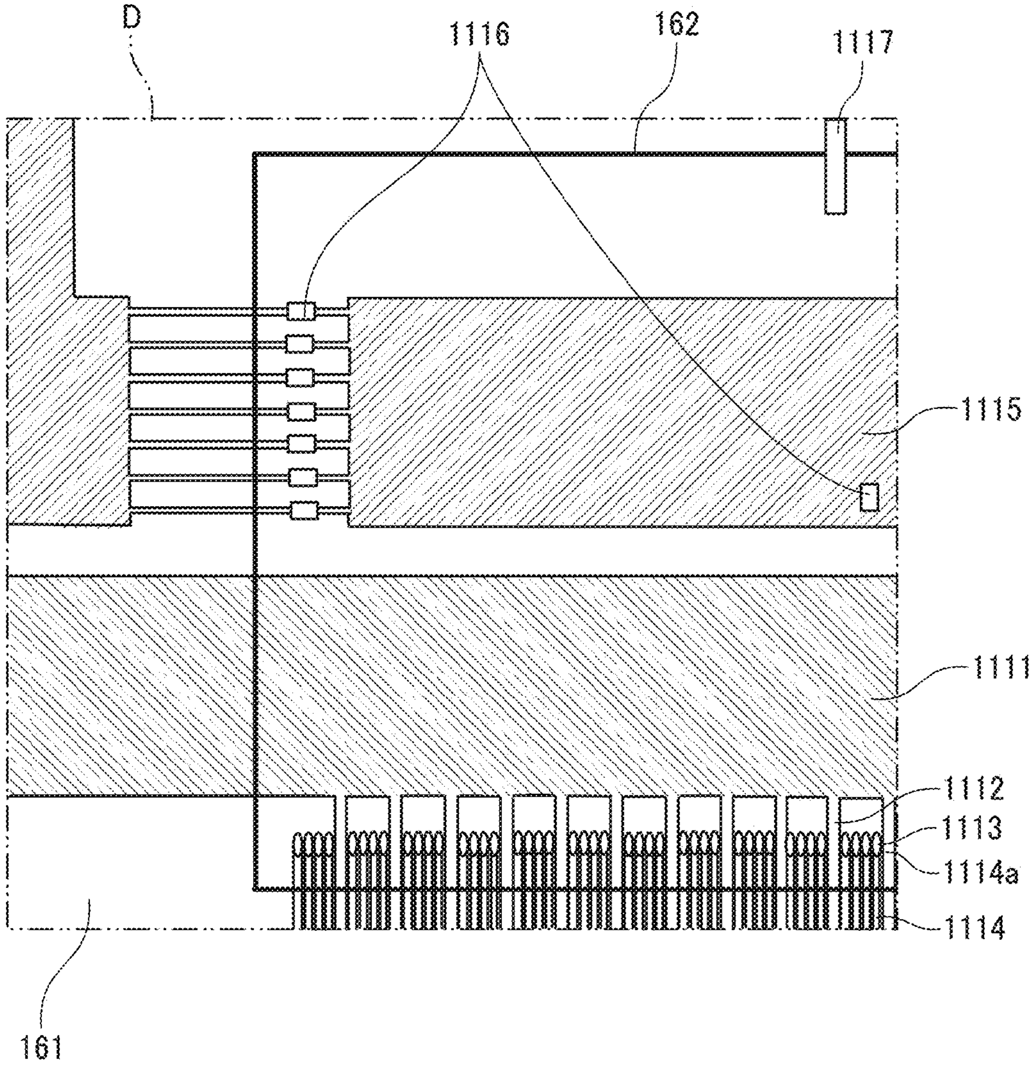
FIG. 9 is an enlarged view of a portion D of the wiring component in FIG. 8.
Figure 10:
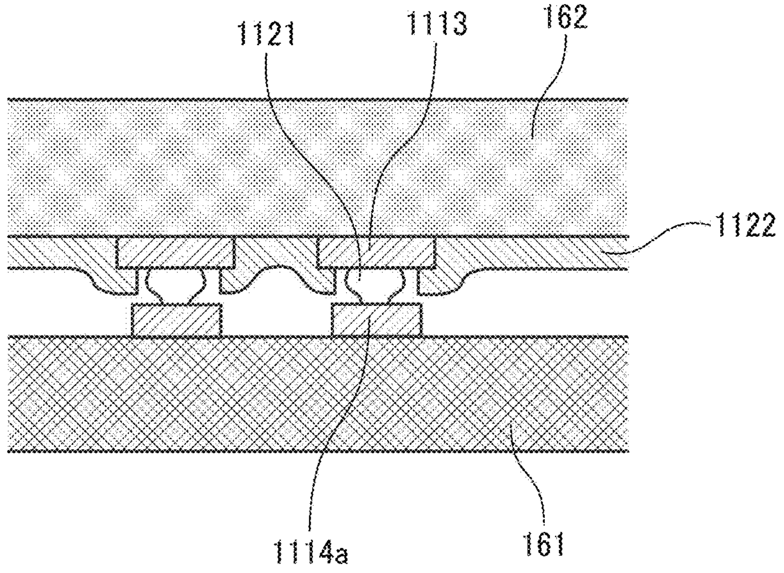
FIG. 10 is a cross-sectional view of the wiring component in FIG. 8 with a terminal of a driver (integrated circuit) IC electrically connected to a pad.

An example of the wiring member 160 is described with reference to FIGS. 8 to 10. FIG. 8 is a plan view of a wiring component of the discharge head in FIG. 1. FIG. 9 is an enlarged view of a portion D of the wiring component in FIG. 8. FIG. 10 is a cross-sectional view of the wiring component in FIG. 8 with a terminal of a driver IC electrically connected to a pad.

The wiring member 160 has a driver IC 162 mounted on the wiring substrate 161. The wiring substrate 161 has a first common electrode wiring 1111 arranged in the longitudinal direction of the driver IC 162 in a region facing the driver IC 162. Multiple second common electrode wirings 1112 are branched from a portion of the first common electrode wiring 1111, which is covered by the driver IC 162. In the present embodiment, the first common electrode wiring 1111 and the second common electrode wirings 1112 are electrode wirings that are electrically connected to the common electrodes commonly placed for the multiple piezoelectric elements 140 mounted on the individual channel member 120.

Along the edge of the driver IC 162, power output terminals 1113 for multiple piezoelectric elements 140 are arranged in a row and connected to the individual electrode wiring 1114. The power output terminals 1113 of the multiple piezoelectric elements 140 are arranged such that, for every predetermined number (every four in the present embodiment), the space between adjacent power output terminals 1113 is wider than the spaces between other adjacent power output terminals.

The multiple second common electrode wirings 1112, which branch off from the first common electrode wiring 1111, are located between the power output terminals 1113 of the multiple piezoelectric elements 140. The second common electrode wirings 1112 are placed between the power output terminals 1113 of the piezoelectric elements 140, which are arranged with the space wider than the space between other adjacent power output terminals 1113 of the piezoelectric elements 140.

The second common electrode wirings 1112, which are drawn from the bottom of the driver IC 162, are alternately arranged with a predetermined number of individual electrode wirings 1114, also drawn from the bottom of the driver IC 162, and extends outward to connect to the piezoelectric elements 140.

The individual electrode wirings 1114 are electrically connected to the individual electrodes of the piezoelectric elements 140 whereas the second common electrode wirings 1112 are electrically connected to the common electrode of the piezoelectric elements 140. The common electrode of the piezoelectric elements 140 may electrically connect the second individual electrodes facing the individual electrodes of the n piezoelectric elements 140.

On the wiring substrate 161, the common power supply wiring 1115 for the piezoelectric elements 140 is arranged in the area under the driver IC 162. Further, the power input terminals 1116 for the piezoelectric elements 140 are aligned at the end of the driver IC 162 in its longitudinal direction, and is connected to the common power supply wiring 1115 of the piezoelectric elements 140.

The common power supply wiring 1115 of the piezoelectric elements 140 is connected to the power output terminals 1113 of the piezoelectric elements 140 inside the driver IC 162. As illustrated in FIG. 10, the power output terminals 1113 of the piezoelectric elements 140 are electrically connected to pads 1114*a* of the individual electrode wirings 1114 through conductive bumps 1121 (or ACF, conductive wire, etc.), and is electrically connected to the individual electrodes of the piezoelectric elements 140 through the individual electrode wirings 1114. The surface of the driver IC 162 on which the conductive bumps 1121 are placed is covered with an insulating film 1122.

The first common electrode wiring 1111 is arranged between the common power supply wiring 1115 of the piezoelectric elements 140 and the row of power output terminals 1113 of the piezoelectric elements 140.

Preferably, the common power supply wiring 1115 and the first common electrode wiring 1111 of the piezoelectric element 140 are extended from the short side of the driver IC 162 to outside the area facing the driver IC 162 on the wiring substrate 161.

This allows for a reduction in the likelihood of voids remaining after a filler, such as underfill, is poured in following the mounting of the driver IC 162, enhancing both yield and reliability.

The wiring substrate 161 is equipped with control signal wiring 1118, which is connected to the control signal input terminal 1117 of the driver IC 162. The switch is controlled to be ON or OFF based on the control signal input to the control signal input terminal 1117.

In this configuration, multiple second common electrode wirings 1112 branch off from the portion of the first common electrode wiring 1111 covered by the driver IC 162. These second common electrode wirings 1112 are arranged between the power output terminals 1113 of the piezoelectric elements 140 (which are the multiple individual power output terminals arranged in rows of the driver IC 162), also positioned between the individual electrode wirings 1114.

Returning to FIGS. 1 to 6, the protective member 170 is adjacent to both sides of the nozzle plate 110 in a direction parallel to the nozzle surface 110*a*, and are disposed so as to overlap the drive circuit (of the drive IC 162) of the wiring member 160 in a direction perpendicular to the nozzle surface 110*a* (or liquid discharge direction).

In other words, the nozzle plate 110 has multiple nozzles 111 from which a liquid is dischargeable in a discharge direction, the multiple nozzles arrayed in a nozzle array direction. The individual channel member 120 including individual channels respectively communicating with the multiple nozzles 111. The multiple pressure generators generate pressure to discharge the liquid from the multiple nozzles, respectively. The wiring member includes a drive circuit to output a drive signal to each of the multiple pressure generators. The protector (e.g., the protective member 170) is adjacent to at least one side of the nozzle plate in a direction perpendicular to the discharge direction and overlaps the drive circuit of the wiring member in the discharge direction. The housing 180 holds the protector, the nozzle plate, and the individual channel member. The housing has a gas inlet and a gas outlet. The gas channel (e.g., the first gas channel 191) is placed between the protector and the wiring member and communicates with each of the gas inlet and the gas outlet.

The direction perpendicular to the discharge direction is parallel to the nozzle surface 110*a*.

In this configuration, the drive circuit (or driver IC 162) is disposed to be separated from the individual channel member 120, including a liquid channel, the nozzle plate 110, and the common channel member 150, so as to prevent heat of the driver IC 162 from being easily transmitted to these members. The driver IC 162 is positioned adjacent to the individual channel member 120, where the piezoelectric elements 140 are placed, to avoid the signal supplied to the piezoelectric elements 140 being affected by loss or noise.

The housing 180 holds the protective member 170, the nozzle plate 110, and the individual channel member 120. The housing 180 is provided with a cover 181 to cover the wiring member 160. The housing 180 includes a liquid supply port 182 and a liquid collection port 183, as well as a gas supply port 184, which serves as a gas inlet, and a gas exhaust port 185, which serves as a gas outlet.

The protective member 170 forms a raised portion 171 around the side facing the wiring member 160, creating a recessed portion 172 inside. Further, a space 173 is formed between the protective member 170 and the wiring member 160, serving as the first gas channel 191 facing the driver IC 162.

As illustrated in FIG. 6, a gap 174 is provided between the housing 180 and the common channel member 150. The gap 174 serves as a bridging channel 193 that communicates with the first gas channels 191, which are formed by the spaces 173 of the protective members 170 on both sides. In this arrangement, each first gas channel 191, which is formed by the space 173 between the protective member 170 and the wiring member 160, communicates with the gas supply port 184 and the gas exhaust port 185 through the bridging channel 193.

With such a space 173 between the protective member 170 and the wiring member 160, the first gas channel 191 is formed solely through the modification of component shapes, allowing for a gas channel for cooling without the use of additional components.

If the first gas channel 191 is not included, additional mechanisms for heat dissipation or radiation are used to cool the heat generated by the driver IC 162. For example, a heat dissipator such as a heatsink on the driver IC 162 is placed, or a thermal conductor such as heat pipe is installed to dissipate heat outside the head. Such heat dissipation or radiation mechanisms may complicate and increase the size of the head structure. The present embodiment allows for the discharge of heat generated by the driver IC 162 without using such cooling mechanisms.

When cooling the heat generated by the driver IC 162 of the discharge head 100, cooling gas, such as air, is supplied from the gas supply port 184 of the housing 180. The flow AR1 of air follows a path indicated by the white arrows. In other words, the air supplied from the gas supply port 184 to the first gas channel 191 travels from one of the first gas channels 191, through the bridging channel 193, to the other first gas channel 191, and is then discharged from the gas exhaust port 185. The cooling gas supplied to the gas supply port 184 is supplied from outside the liquid discharge head 100, with controlled pressure or flow rate. The pressure or flow rate of the gas supplied to the gas supply port 184 can be appropriately set according to the amount of heat generated by the driver IC 162.

When cooling the heat generated by the driver IC 162, which faces the first gas channel 191, the temperature rise of the liquid flowing within the discharge head 100 is reduced or prevented, and fluctuations in discharge characteristics due to changes in viscosity are controlled. The heat-generating driver IC 162 is mounted on the wiring member 160, positioned away from the individual channel member 120, the common channel member 150, and the nozzle plate 110. This arrangement makes it difficult for the heat generated by the driver IC 162 to transfer to the liquid flowing through the channels within the discharge head 100, further minimizing fluctuations in discharge characteristics due to changes in the viscosity of the liquid.

Thus, even when the driver IC 162 is positioned inside the discharge head 100, the miniaturization and simplification of the head can be achieved while reducing or preventing temperature rises and fluctuations in the liquid due to the heat generated by the driver IC, resulting in stable discharge characteristics.

Figure 11:
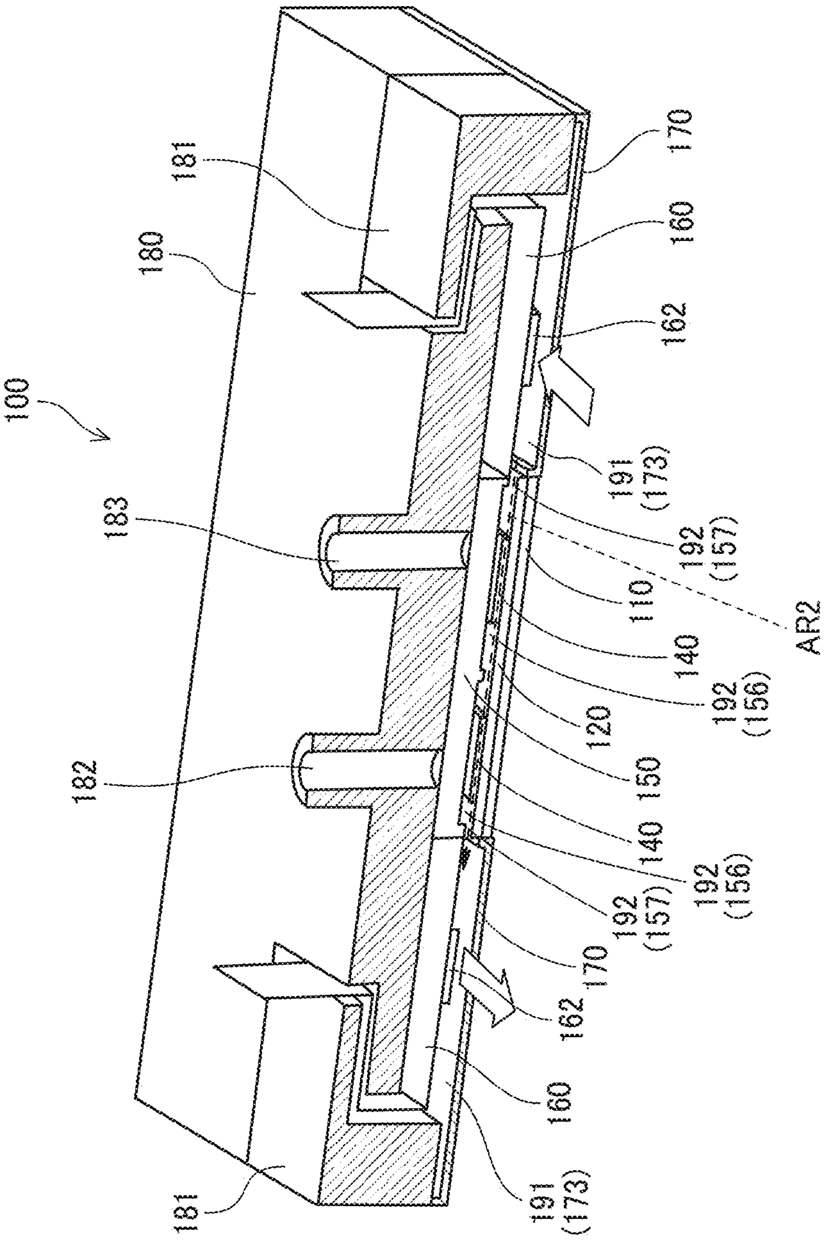
FIG. 11 is a perspective view of a discharge head according to a second embodiment of the present disclosure.

The waste liquid tube 103 according to a second embodiment of the present disclosure is described with reference to FIG. 11. FIG. 11 is a cross-sectional view of the discharge head 1 according to the second embodiment of the present disclosure.

In the present embodiment, a space 156 are created between the individual channel member 120 and the common channel member 150 and designed to accommodate the piezoelectric elements 140. Further, a gap 157 is provided to communicate between the spaces 173 on its both sides, forming the first gas channels 191. The space 156 and the gap 157 form a second gas channel 192 for cooling the piezoelectric elements 140.

With such a configuration, similarly to the first embodiment, the air supplied from the gas supply port 184 to the first gas channel 191 travels from one of the first gas channels 191, through the bridging channel 193, to the other first gas channel 191, and is then discharged from the gas exhaust port 185. Thus, the heat generated by the driver IC 162 is exhausted.

A part of the air supplied from the first gas channel 191 travels from one of the first gas channels 191, through the second gas channel 192 formed by the space 156, to the other first gas channel 191, and is then discharged from the gas exhaust port 186. As a result, the heat generated by the piezoelectric elements 140 is removed, preventing or reducing temperature increases in the discharged liquid. By using dry air or dry nitrogen with a low moisture content as the supplied air, the humidity of the gas surrounding the piezoelectric elements 140 can be reduced. This helps prevent deterioration or damage to the piezoelectric elements 140 caused by moisture or similar factors.

With the gap 157 between the individual channel member 120 and the common channel member 150, which leads to the space 156 housing the piezoelectric elements 140, connected to the first gas channel 191, a second gas channel 192 is formed. This approach enables the construction of a cooling gas channel without using additional components.

Figure 12:
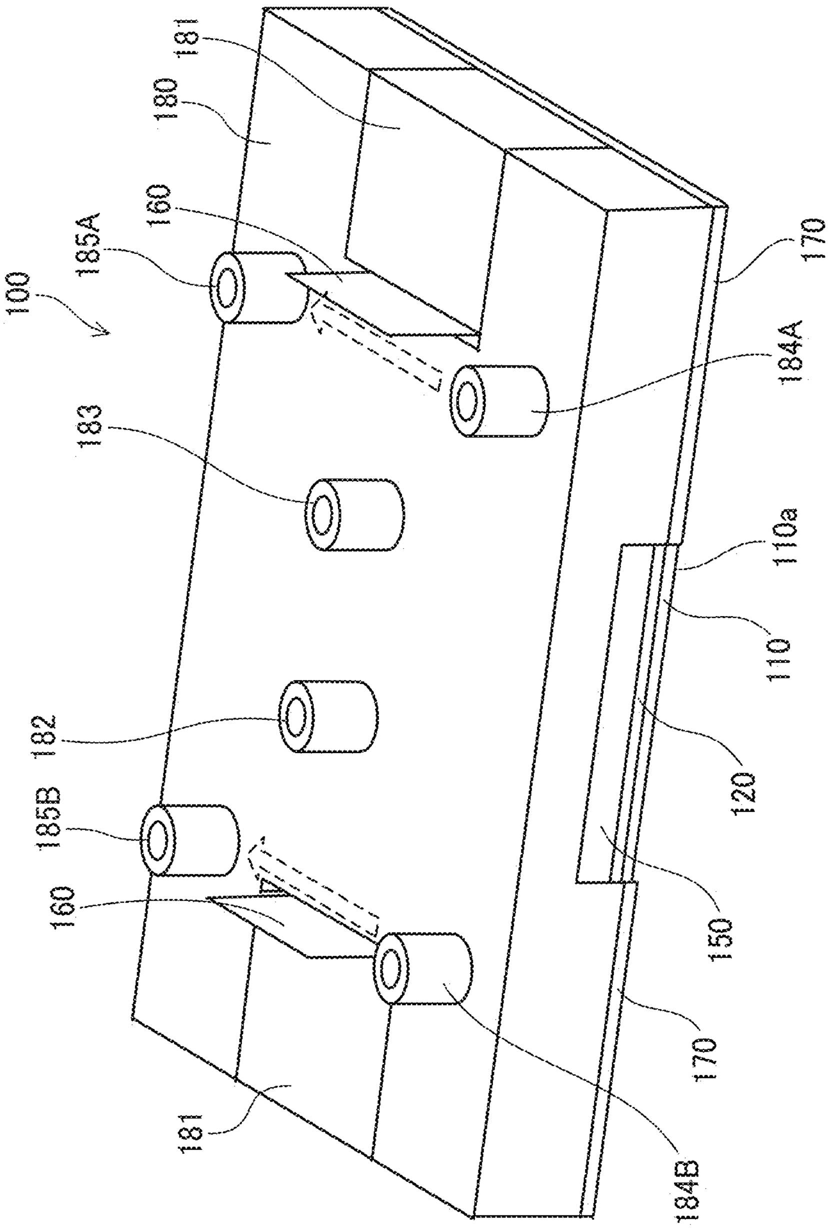
FIG. 12 is a perspective view of a discharge head according to a third embodiment of the present disclosure.
Figure 13:
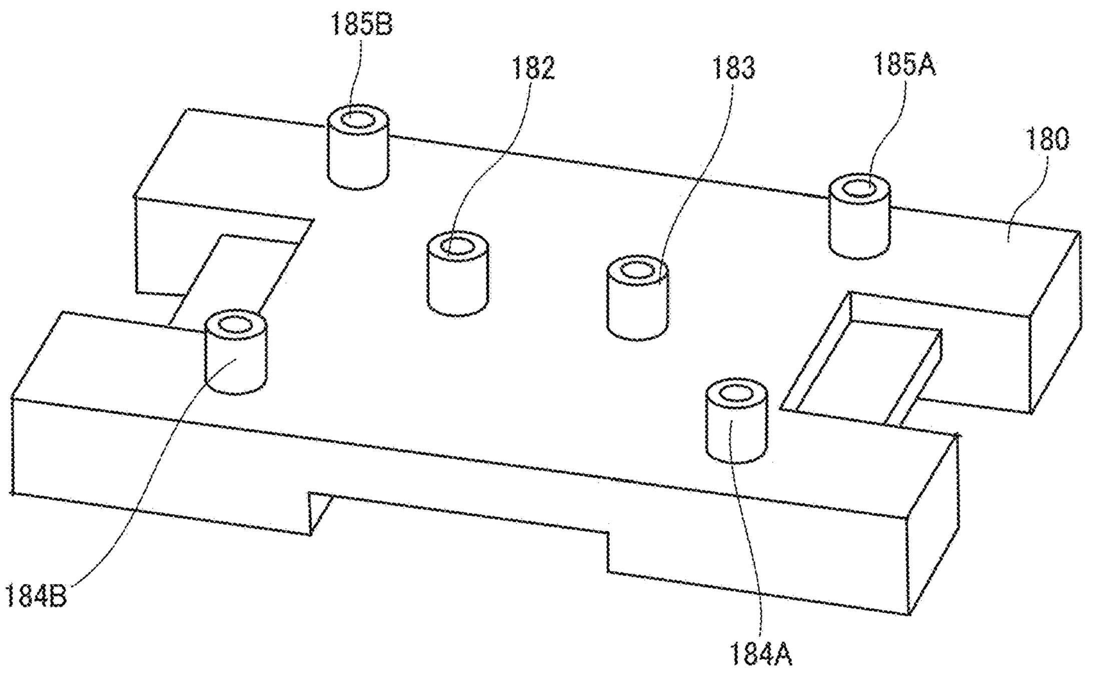
FIG. 13 is a perspective view of a housing of the discharge head in FIG. 12.
Figure 14:
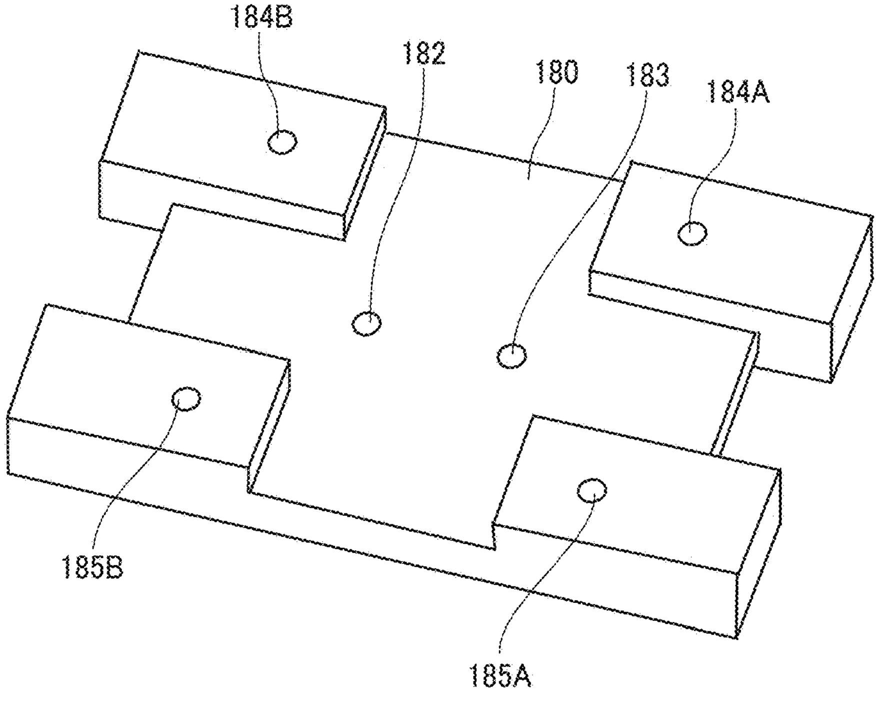
FIG. 14 is a perspective view of the housing in FIG. 13 as viewed from its bottom.

The third embodiment of the present disclosure is described below with reference to FIGS. 12 to 14. FIG. 12 is a perspective view of a discharge head according to the third embodiment of the present disclosure. FIG. 13 is a perspective view of a housing of the discharge head in FIG. 12. FIG. 14 is a perspective view of the housing in FIG. 13 as viewed from its bottom.

In the present embodiment, multiple (e.g., two in the present embodiment) first gas channels are formed between two protective members 170 and two wiring members 160 in the first embodiment.

The housing 180 includes a gas supply port 184A, which serves as a gas inlet, and a gas exhaust port 185A, which serves as a gas outlet. Both the gas supply port 184A and the gas exhaust port 185A communicate to one of the first gas channels. The housing 180 includes a gas supply port 184B, which serves as a gas inlet, and a gas exhaust port 185B, which serves as a gas outlet. Both the gas supply port 184B and the gas exhaust port 185B communicate to the other first gas channel.

This eliminates the need to form the gap 174 serving as the bridging channel 193 in the first embodiment, and the shape of the housing is simplified, so that the parts can be manufactured at low cost and with high accuracy. Further, since the first gas channels are placed for each driver IC 162, the cooling effect can be enhanced. By shortening the path of the first gas channel, its fluid resistance can be reduced, enabling a lower pressure for the supplied cooling gas.

Figure 15:
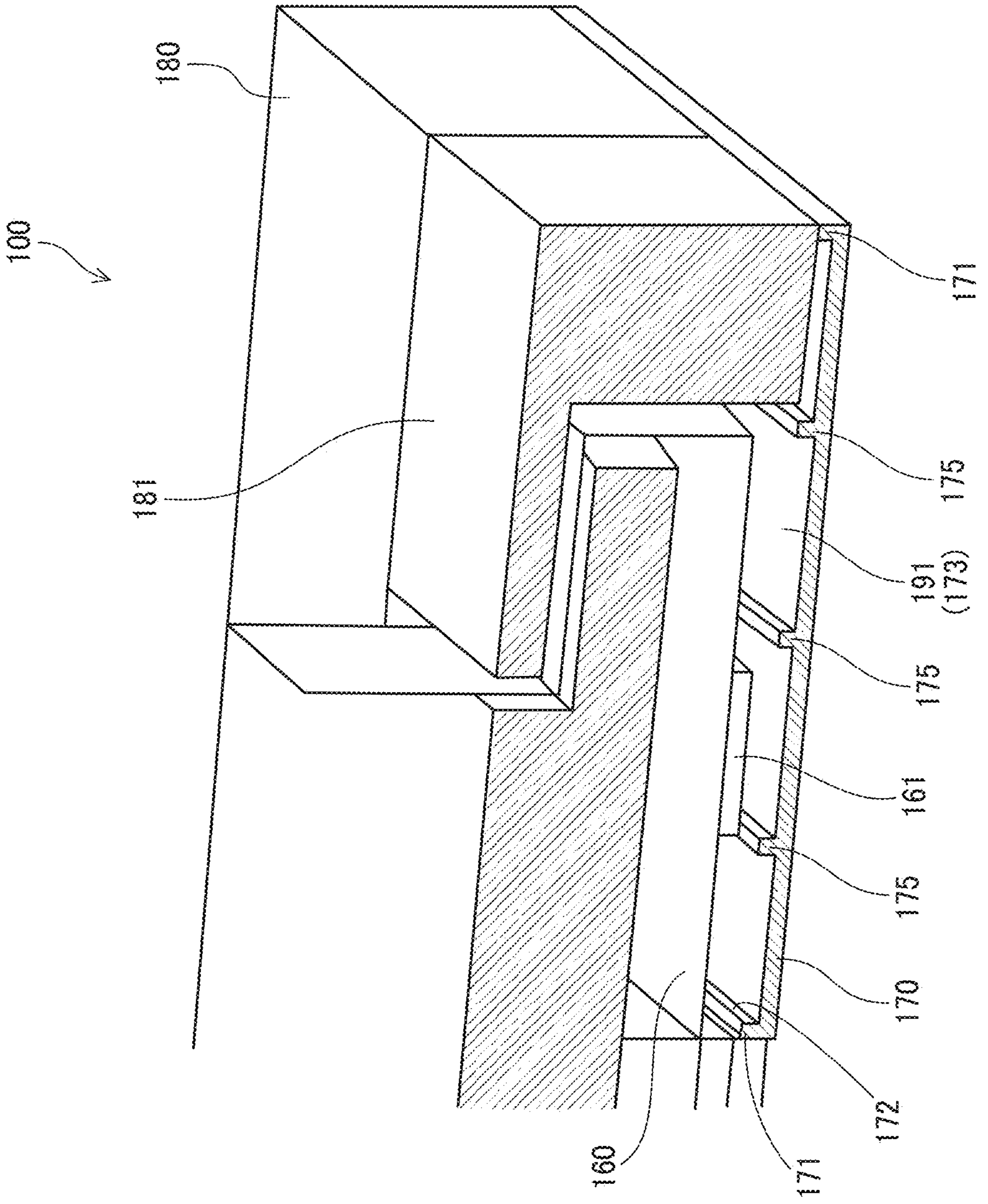
FIG. 15 is a cross-sectional and enlarged view of a portion of a discharge head according to a fourth embodiment of the present disclosure.

The waste liquid tube 103 according to a fourth embodiment of the present disclosure is described with reference to FIG. 15. FIG. 15 is an enlarged plan view of a main part of the head 1 according to the fourth embodiment.

In the present embodiment, one or more ribs 175 are located within the recessed portion 172 of the protective member 170, which serves as the inner wall of the first gas channel 191.

By placing a rib or ribs 175 within the first gas channel 191, it rectifies the flow of gas through the first gas channel 191, allowing for more efficient circulation of the cooling gas.

Further, with such a rib or ribs 175, the strength of the protective member 170 is increased, allowing for an enlargement of the cross-sectional area of the first gas channel 191. This enhances the flow rate of the cooling gas while reinforcing the robustness of the protective member 170. This enables an increase in cooling efficiency and ensures the protective member 170 remains undeformed and robust, even when exposed to media or other elements from the outside.

The ribs are preferably arranged along the direction in which the cooling gas flows, but the arrangement and shape may be changed in accordance with the direction in which the flow is to be rectified. For instance, as in the second embodiment, if a second gas channel 192 is provided to direct gas across the flow of the first gas channel 191, ribs 175 may be positioned at the entrance side of the second gas channel 192 to ensure the flow of cooling gas.

An example of a manufacturing process of the discharge head 100 is described below.

Although metal such as stainless steel or nickel or resin such as polyimide can be used for the nozzle plate 110, silicon is used in the present embodiment to form holes (nozzle holes) serving as the nozzles 111 with high accuracy. Nozzle holes from which ink is discharged are formed in a silicon wafer having a thickness of 600 μm by photolithography and dry etching. The nozzle hole has a diameter of 0.02 mm.

Thereafter, the wafer is polished to a thickness of 100 μm and cut into the nozzle plates 110 by dicing.

After the above processes, a water repellent film as the liquid repellent film is formed only on the nozzle face 110*a* of the nozzle plate 110.

The individual channel member 120 has a channel for supplying ink to the nozzles 111 of the nozzle plate 110. A $SiO_2$ film with a thickness of 0.6 μm, a Si film with a thickness of 1.5 μm, and a $SiO_2$ film with a thickness of 0.4 μm are laminated over the silicon wafer having the thickness of 600 μm to form a three layer diaphragm. A Ti film with a thickness of 20 nm and a Pt film with a thickness of 200 nm are formed as a lower electrode over the diaphragm by sputtering.

Then, a film with a thickness of 2 μm is formed over the lower electrode by sol-gel method using an organic metal solution containing lead zirconate titanate (PZT), and the film is sintered at 700° C. to form a piezoelectric film of PZT.

Thereafter, a Pt film with a thickness of 200 nm is formed as an upper electrode over the piezoelectric film by sputtering.

After the upper electrode is formed, the upper electrode, the piezoelectric film, and the lower electrode are patterned by dry etching to form piezoelectric elements corresponding to pressure chambers.

Next, an interlayer insulating film is formed over the upper and lower electrodes by plasma chemical vapor deposition (CVD), and contact holes are formed in the interlayer insulating film. Then, a Ti film with a thickness of 50 nm and an Al film with a thickness of 2 μm are sequentially laminated, and a wiring layer is formed by dry etching.

A portion of the diaphragm corresponding to an ink supply port is dry-etched to complete a wafer which is a base of an individual pressure channel.

Next, a holding substrate is formed using a silicon wafer. The holding substrate has a holding substrate recess and a holding substrate opening to be a supply port. An epoxy-based adhesive is applied to a surface to be bonded of the prepared holding substrate wafer in a film thickness of 2 μm by a flexographic printing machine and attached to the liquid chamber substrate, and the adhesive is cured, thereby bonding the holding substrate and the liquid chamber substrate.

After the individual pressure channel is polished from 600 μm thick to 80 μm thick, the pressure chamber and a fluid restrictor are formed by ICP dry etching, and the wafer is diced into chips to complete the channel substrate.

The individual channel member 120 includes a connection portion to which electrical signals are input. The wiring layer is drawn out to the end portion of the individual channel plate 120, and the wiring member 160 is connected thereto.

The common channel member 150 with a common channel for supplying ink to each pressure chamber 121 is placed upstream of the individual channel member 120 in the direction perpendicular to the nozzle surface 110*a* (or liquid discharge direction). The common channel member 150 is formed by dry etching a silicon wafer.

The housing 180 can be made from materials such as resin, including epoxy and polyphenylene sulfide (PPS), or metals such as stainless steel. In the present embodiment, the epoxy resin is used. The housing 180 features two ink ports, allowing the supply of one or two colors of ink. The housing 180 includes two airports serving as gas ports. The housing 180 includes a recess on its side closer to the common channel member 150 to accommodate the common channel member 150. The housing 180 has a recess designed to create a space between the housing 180 (or its side closer to the common channel member 150) and the common channel member 150, allowing for communication with the two air ports.

The protective member 170 protects the nozzle plate 110 from media and a wiper. The protective member 170 can be made from materials such as resin, including epoxy and polyphenylene sulfide (PPS), or metals such as stainless steel. In the present embodiment, the epoxy resin is used. The protective member 170 has a flat surface facing the liquid discharge face and a recessed portion 172 facing the housing 180. This serves as the first gas channel 191, which communicates with the air ports, allowing the flowing air to cool the driver IC 162 mounted with the drive circuit.

The cover 181 can be made of resin such as epoxy or PPS, or metal such as stainless steel. The epoxy resin is used in the present embodiment.

The wiring member 160 includes a flexible wiring substrate 161 and is electrically connected to the common channel member 150 on which the wiring of the individual channel member 120 is present. The connection method may be soldering, anisotropic conductive film (ACF), or non-conductive paste (NCP). In the present embodiment, NCP is used.

The wiring member 160 has the driving circuit (or the driver IC 162) positioned closer to the protective member 170. When the driving circuit is located on the individual channel member 120, the drive circuit is cooled, but the heat generated leads to a temperature distribution across the nozzle plate 110, which results in a deterioration of the discharge characteristics.

In view of such a situation, the driving circuit (or the driver IC 162) is placed on the wiring substrate 161 of the wiring member 160. This, however, involves cooling the driving circuit. Cooling methods include the aforementioned water cooling and heat dissipation elements such as heat sinks. These may lead to deterioration in discharge characteristics and an increase in size. Hence, air cooling is used to preserve discharge performance while minimizing size expansion.

The nozzle plate 110, the individual channel member 120, and the common channel member 150 are bonded to each other with an epoxy-based adhesive. The nozzle plate 110 and the individual channel member 120 can be directly bonded with silicon. Further, the common channel member 150, the housing 180, the protective member (170), and the cover 181 are all bonded using an epoxy-based adhesive.

The wiring member 160 is bent and led out to the top of the discharge head 100. Additionally, the cover 181 is adhered to the housing 180 to prevent ink from entering inside.

The protective member 170 is bonded to the housing 180 and the cover 181 with adhesive, and a sealing material is filled into the gap between the nozzle plate 110 and the protective member 170, as well as around the wiring member lead-out section.

Figure 16:
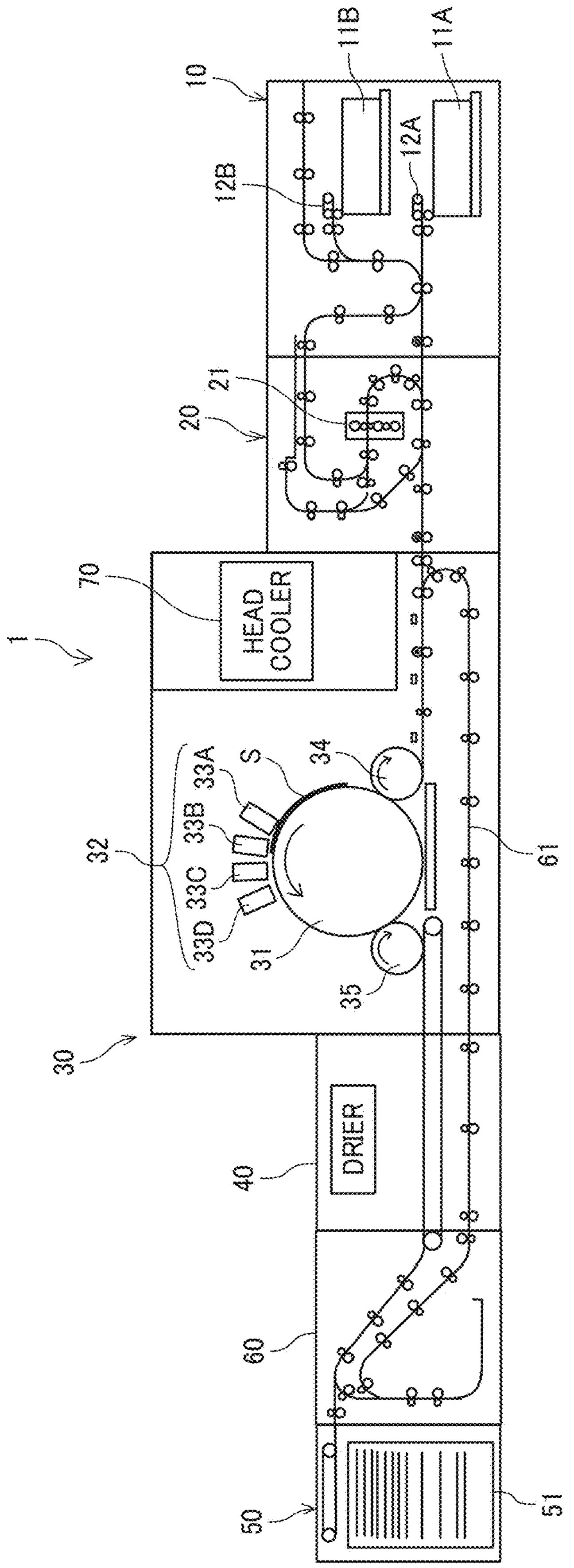
FIG. 16 is a schematic diagram of a discharge apparatus according to a fifth embodiment of the present disclosure.

The fifth embodiment of the present disclosure is described below with reference to FIG. 16. FIG. 16 is a schematic view of the discharge apparatus according to the fifth embodiment.

A printer 1 as the discharge apparatus according to the tenth embodiment includes a loading unit 10 to load a sheet S into the printer 1, a pretreatment unit 20, a printing unit 30, a drying unit 40, a reverse unit 60, and an ejection unit 50.

In the printer 1, the pretreatment unit 20 applies, if desired, a pretreatment liquid onto the sheet S forwarded (supplied) from the loading unit 10, the printing unit 30 applies a liquid (e.g., ink) to the sheet S to perform desired printing, the drying unit 40 dries the liquid adhering to the sheet S, and the sheet S is ejected to the ejection unit 50.

The loading unit 10 includes a lower loading tray 11A and an upper loading tray 11B to accommodate multiple sheets S and feeding units 12A and 12B to separate and forward the sheets S one by one from the lower and upper loading trays 11A and 11B, and supplies the sheets S to the pretreatment unit 20.

The pretreatment unit 20 includes, e.g., a coater 21 as a treatment-liquid application unit that coats a printing surface of the sheet S with a treatment liquid having an effect of aggregation of ink particles to prevent bleed-through.

The printing unit 30 includes a drum 31 and a liquid discharge apparatus 32. The drum 31 is a bearer (rotator) that bears the sheet S on a circumferential surface of the drum 31 and rotates to convey the sheet S (i.e., the drum 31 serves as a conveyor). The liquid discharge apparatus 32 discharges the liquid toward the sheet S borne on the drum 31.

The printing unit 30 further includes transfer cylinders 34 and 35. The transfer cylinder 34 receives the sheet S from the pretreatment unit 20 and forwards the sheet S to the drum 31. The transfer cylinder 35 receives the sheet S conveyed by the drum 31 and forwards the sheet S to the drying unit 40.

The transfer cylinder 34 includes a sheet gripper to grip a leading end of the sheet S conveyed from the pretreatment unit 20 to the printing unit 30. The sheet S thus gripped is conveyed as the transfer cylinder 34 rotates. The transfer cylinder 34 forwards the sheet S to the drum 31 at a position opposite the drum 31.

Similarly, the drum 31 includes a sheet gripper on the surface of the drum 31, and the leading end of the sheet S is gripped by the sheet gripper of the drum 31. The drum 31 has a plurality of suction holes dispersedly on the surface of the drum 31, and a suction unit generates suction airflows directed inward from desired suction holes of the drum 31.

On the drum 31, the sheet gripper grips the leading end of the sheet S forwarded from the transfer cylinder 34, and the sheet S is attracted to and borne on the drum 31 by the suction airflows by the suction unit. As the drum 31 rotates, the sheet S is conveyed.

The liquid discharge apparatus 32 includes discharge head units 33 (discharge head units 33A to 33D) to discharge liquids. For example, the discharge head unit 33A discharges a liquid of cyan (C), the discharge head unit 33B discharges a liquid of magenta (M), the discharge head unit 33C discharges a liquid of yellow (Y), and the discharge head unit 33D discharges a liquid of black (K). Further, the liquid discharge apparatus 32 may include a discharge head unit 33 that discharges special liquid, i.e., liquid of spot color such as white, gold, or silver.

As the discharge head unit 33, for example, a full-line head in which the discharge heads 100 according to any of the first to fourth embodiments are arranged in a staggered manner may be used.

A discharge operation of each of the discharge head units 33 of the liquid discharge apparatus 32 is controlled by a drive signal corresponding to print data. When the sheet S borne on the drum 31 passes through a region facing the liquid discharge apparatus 32, the liquids of respective colors are discharged from the discharge head units 33, and an image corresponding to the print data is formed on the sheet S.

The printing unit 30 includes a head cooler 70 that supplies a cooling gas to the gas supply port 184 included in each discharge head unit 33 of the liquid discharge unit 32 and collects the cooling gas from the gas exhaust port 185 included in each discharge head unit 33.

The head cooler 70 supplies pressurized cooling gas to the gas supply port 184 on each discharge head unit 33. The supply pressure is appropriately set according to the temperature and the operational status of each discharge head unit 33. The head cooler 70 expels the cooling gas, which is emitted from the gas exhaust port 185 of each discharge head unit 33, to the exterior of the printing unit 30 in a manner that does not affect the temperature of each discharge head unit 33.

The head cooler 70 can be comprised of, for example, an air compressor and a regulator for adjusting pressure and is connected to each discharge head unit 33 through, for example, a plastic tube.

The sheet S moves relative to the liquid discharge apparatus 32, and the relative movement direction is a direction in which the sheet S passes through the region facing the liquid discharge apparatus 32 (i.e., the second direction x). The relative movement direction corresponds to the rotation direction of the drum 31 indicated by arrows illustrated in FIG. 31. The upstream side of the relative movement direction of the sheet S (upstream side of the second direction x) is the upstream side of the rotation direction of the drum 31, and corresponds to the right side of the liquid discharge apparatus 32 in FIG. 31.

The drying unit 40 dries the liquid applied onto the sheet S by the printing unit 30. Thus, a liquid component such as moisture in the liquid evaporates, and the colorant contained in the liquid is fixed on the sheet S. Additionally, curling of the sheet S is reduced.

The reverse unit 60 reverses, in switchback manner, the sheet S that has passed through the drying unit 40 in duplex printing. The reversed sheet S is fed back to the upstream side of the transfer cylinder 34 through a conveyance passage 61 of the printing unit 30.

The ejection unit 50 includes an ejection tray 51 on which multiple sheets S are stacked. The multiple sheets S conveyed through the reverse unit 60 from the drying unit 40 are sequentially stacked and held on the ejection tray 51.

Figure 17:
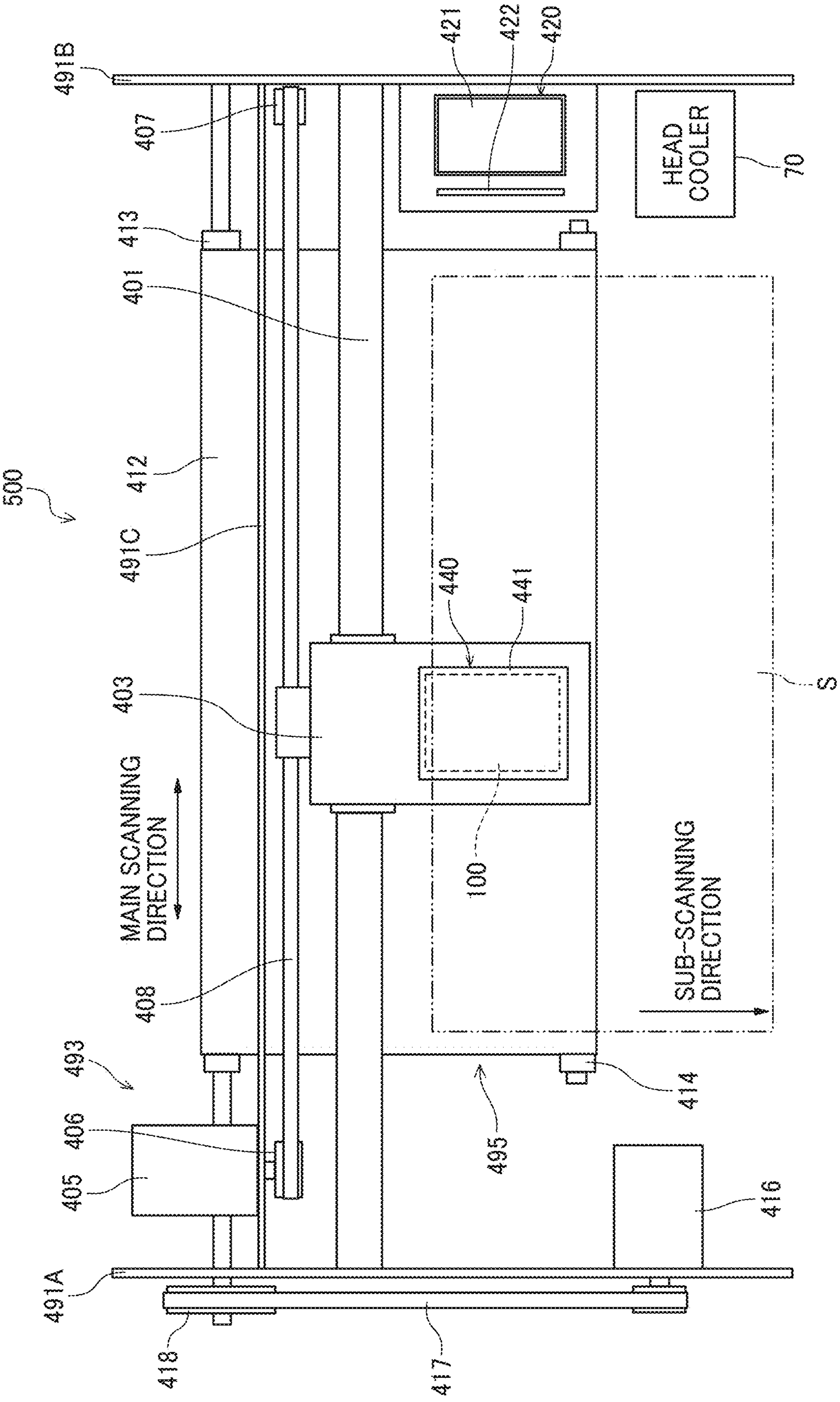
FIG. 17 is a plan view of a portion of a printer as a discharge apparatus according to a sixth embodiment of the present disclosure.
Figure 18:
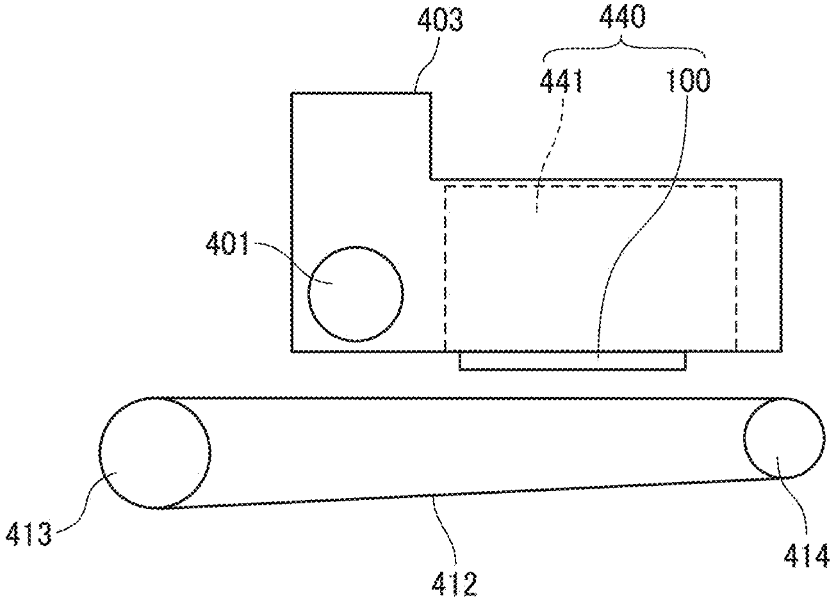
FIG. 18 is a front view of the portion of the printer in FIG. 17.

A waste liquid tube 103 according to a sixth embodiment of the present disclosure is described with reference to FIGS. 17 and 18. FIG. 17 is a schematic plan view of a part of a printer as the discharge apparatus according to the eleventh embodiment. FIG. 18 is a schematic front view of the part of the printer of FIG. 32.

A printer 500 according to the eleventh embodiment is a serial type apparatus, and a main-scanning moving mechanism 493 reciprocally moves a carriage 403 in a main scanning direction. The main-scanning moving mechanism 493 includes, for example, a guide 401, a main-scanning motor 405, and a timing belt 408. The guide 401 is bridged between left and right side plates 491A and 491B to movably hold the carriage 403. The main-scanning motor 405 reciprocates the carriage 403 in the main scanning direction via the timing belt 408 looped around a drive pulley 406 and a driven pulley 407.

The carriage 403 mounts a liquid discharge unit 440 including the discharge head 100 according to the above-described embodiments of the present disclosure and a head tank 441 as a single integrated unit. The liquid discharge unit 440 may include the discharge head unit 33 according to the above-described embodiments of the present disclosure.

The discharge head 100 of the liquid discharge unit 440 discharges liquids of different colors, for example, yellow (Y), cyan (C), magenta (M), and black (K).

The printer 1 includes a head cooler 70 that supplies a cooling gas to the gas supply port 184 included in the discharge head unit 100 and collects the cooling gas from the gas exhaust port 185 included in the discharge head unit 100.

The head cooler 70 supplies pressurized cooling gas to the gas supply port 184 on the discharge head unit 100. The supply pressure is appropriately set according to the temperature and the operational status of the discharge head unit 100. The head cooler 70 expels the cooling gas, which is emitted from the gas exhaust port 185 of the discharge head unit 100, to the exterior of the printer 1 in a manner that does not affect the temperature of the discharge head unit 100.

The head cooler 70 can be comprised of, for example, an air compressor and a regulator for adjusting pressure and is connected to the discharge head unit 100 through, for example, a plastic tube.

The printer 500 includes a conveyance mechanism 495 to convey a sheet S. The conveyance mechanism 495 includes a conveyance belt 412 as a conveyor and a sub-scanning motor 416 to drive the conveyance belt 412.

The conveyance belt 412 attracts the sheet S and conveys the sheet S to a position facing the discharge head 100. The conveyance belt 412 is an endless belt stretched between a conveyance roller 413 and a tension roller 414. The sheet

410 can be attracted to the conveyance belt 412 by, for example, electrostatic attraction or air suction.

The conveyance belt 412 circumferentially moves in a sub-scanning direction as the conveyance roller 413 is rotationally driven by the sub-scanning motor 416 via a timing belt 417 and a timing pulley 418.

On one end of the range of movement of the carriage 403 in the main scanning direction, a maintenance mechanism 420 that maintains and recovers the discharge head 100 is disposed lateral to the conveyance belt 412.

The maintenance mechanism 420 includes, for example, a cap 421 to cap the nozzle face (i.e., the surface on which the nozzles 4 are formed) of the discharge head 100 and a wiper 422 to wipe the nozzle face.

The main-scanning moving mechanism 493, the maintenance mechanism 420, and the conveyance mechanism 495 are mounted onto a housing including the side plates 491A and 491B and a back plate 491C.

In the printer 500 having the above-described configuration, the sheet S is fed and attracted onto the conveyance belt 412 and conveyed in the sub-scanning direction (first direction y) by the circumferential movement of the conveyance belt 412.

The discharge head 100 is driven in response to an image signal while the carriage 403 moves in the main scanning direction to discharge liquid onto the sheet S not in motion. As a result, an image is formed on the sheet S.

In the present disclosure, the material to be discharged is not limited to a particular material as long as the material has a viscosity or surface tension to be discharged from a head (discharge head). However, preferably, the viscosity of the material is not greater than 30 millipascal-seconds (mPa·s) under ordinary temperature and ordinary pressure or by heating or cooling. Examples of the liquid to be discharged include a solution, a suspension, or an emulsion including, for example, a solvent, such as water or an organic solvent; a colorant, such as dye or pigment; a functional material, such as a polymerizable compound, a resin, or a surfactant; a biocompatible material, such as deoxyribonucleic acid (DNA), amino acid, protein, or calcium; or an edible material, such as a natural colorant. Such a solution, a suspension, or an emulsion can be used for, e.g., an inkjet ink; a surface treatment liquid; a liquid for forming an electronic element component, a light-emitting element component, or an electronic circuit resist pattern; or a material solution for three-dimensional fabrication.

The term "discharge apparatus" used herein also represents an apparatus including the head module or the head device to drive the discharge head to discharge liquid. The term "discharge apparatus" used here includes, in addition to apparatuses to discharge liquid to a medium onto which liquid can adhere, apparatuses to discharge the liquid into gas (air) or liquid.

The "discharge apparatus" may further include devices relating to feeding, conveying, and ejecting of the medium onto which liquid can adhere and also include a pretreatment device and an aftertreatment device.

The "discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "discharge apparatus" is not limited to an apparatus that discharges liquid to visualize meaningful images such as letters or figures. For example, the liquid discharge apparatus may be an apparatus to form meaningless images, such as meaningless patterns, or fabricate three-dimensional images.

The above-described term "medium onto which liquid can adhere" represents a medium on which liquid is at least temporarily adhered, a medium on which liquid is adhered and fixed, or a medium into which liquid adheres and permeates. Specific examples of the "medium onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "medium onto which liquid can adhere" includes any medium to which liquid adheres, unless otherwise specified.

Examples of materials of the "medium onto which liquid can adhere" include any materials to which liquid can adhere even temporarily, such as paper, thread, fiber, fabric, leather, metal, plastic, glass, wood, and ceramic.

The term "discharge apparatus" may be an apparatus to relatively move the discharge head and the medium onto which liquid (i.e., a material to be discharged) can adhere. However, the liquid discharge apparatus is not limited to such an apparatus. For example, the liquid discharge apparatus may be a serial head apparatus that moves the discharge head or a line head apparatus that does not move the discharge head.

Examples of the "discharge apparatus" further include a treatment liquid applying apparatus that discharges a treatment liquid onto a sheet to apply the treatment liquid to the surface of the sheet, for reforming the surface of the sheet; and an injection granulation apparatus that injects a composition liquid, in which a raw material is dispersed in a solution, through a nozzle to granulate fine particles of the raw material.

Aspects of the disclosure are, for example, as follows.

Aspect 1

A liquid discharge head includes a nozzle plate having multiple nozzles from which a liquid is dischargeable in a discharge direction, the multiple nozzles arrayed in a nozzle array direction; an individual channel member including individual channels respectively communicating with the multiple nozzles; multiple pressure generators to generate pressure to discharge the liquid from the multiple nozzles, respectively; a wiring member including a drive circuit to output a drive signal to each of the multiple pressure generators; a protector adjacent to at least one side of the nozzle plate in a direction perpendicular to the discharge direction and overlapping the drive circuit of the wiring member in the discharge direction; a housing holding the protector, the nozzle plate, and the individual channel member; and a gas channel. The housing has a gas inlet; and a gas outlet. The gas channel is between the protector and the wiring member and communicates with each of the gas inlet and the gas outlet.

Aspect 2

In the liquid discharge head according to Aspect 1, the protector has a concave portion facing the wiring member to form the gas channel.

Aspect 3

In the liquid discharge head according to Aspect 1 or 2, the protector includes a rib facing the wiring member.

Aspect 4

In the liquid discharge head according to any one of Aspects 1 to 3, the rib extends in a direction from the gas inlet to the gas outlet.

Aspect 5

In the liquid discharge head according to any one of Aspects 1 to 4, the drive circuit is on a side of the wiring member facing the gas channel (e.g., the first gas channel).

Aspect 6

The liquid discharge head according to any one of Aspects 1 to 5, further includes multiple protectors including the protector, arranged in a traverse direction perpendicular to the discharge direction; multiple wiring members including the wiring member, arranged in the traverse direction; multiple gas channels including the gas channel, each of the multiple gas channels disposed between one of the multiple protectors and one of the multiple wiring members in the discharge direction; and a bridging channel communicating between one of the multiple gas channels and another of the multiple gas channels adjacent to the one of the multiple gas channels.

Aspect 7

The liquid discharge head according to any one of Aspects 1 to 5, further includes multiple protectors including the protector, arranged in a traverse direction perpendicular to; multiple wiring members including the wiring member, arranged in the traverse direction; multiple gas channels including the gas channel, each of the multiple gas channels disposed between one of the multiple protectors and one of the multiple wiring members in the discharge direction. The multiple gas channels are independent from each other.

Aspect 8

The liquid discharge head according to any one of Aspects 1 to 7, the individual channel member further includes other multiple gas channels (i.e., the second gas channels 192) to supply gas to the multiple pressure generators. Each of the other multiple gas channels communicates with the gas channel (e.g., the first gas channel 191).

Aspect 9

A liquid discharge apparatus comprising the liquid discharge head according to any one of Aspects 1 to 8.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry.

The invention claimed is:

1. A liquid discharge head comprising:

a nozzle plate including multiple nozzles from which a liquid is dischargeable in a discharge direction, the multiple nozzles arrayed in a nozzle array direction;

an individual channel member including individual channels respectively communicating with the multiple nozzles;

multiple pressure generators to generate pressure to discharge the liquid from the multiple nozzles, respectively;

a wiring member including a drive circuit to output a drive signal to each of the multiple pressure generators;

a protector adjacent to at least one side of the nozzle plate in a direction perpendicular to the discharge direction and overlapping the drive circuit of the wiring member in the discharge direction;

a housing holding the protector, the nozzle plate, and the individual channel member, the housing including:

a gas inlet; and a gas outlet; and a gas channel between the protector and the wiring member and communicating with each of the gas inlet and the gas outlet, wherein the protector includes a concave portion facing the wiring member to form the gas channel.

2. The liquid discharge head according to claim 1, wherein:

the protector includes a rib facing the wiring member.

3. The liquid discharge head according to claim 2, wherein:

the rib extends in a direction from the gas inlet to the gas outlet.

4. The liquid discharge head according to claim 1, wherein:

the drive circuit is on a side of the wiring member facing the gas channel.

5. The liquid discharge head according to claim 1, further comprising:

multiple protectors including the protector, arranged in a traverse direction perpendicular to the discharge direction;

multiple wiring members including the wiring member, arranged in the traverse direction;

multiple gas channels including the gas channel, each of the multiple gas channels disposed between one of the multiple protectors and one of the multiple wiring members in the discharge direction; and a bridging channel communicating between one of the multiple gas channels and another of the multiple gas channels adjacent to the one of the multiple gas channels.

6. The liquid discharge head according to claim 1, further comprising:

multiple protectors including the protector, arranged in a traverse direction perpendicular to the nozzle array direction;

multiple wiring members including the wiring member, arranged in the traverse direction;

multiple gas channels including the gas channel, each of the multiple gas channels disposed between one of the multiple protectors and one of the multiple wiring members in the discharge direction; and wherein the multiple gas channels are independent from each other.

7. The liquid discharge head according to claim 1, wherein:

the individual channel member further includes other multiple gas channels to supply gas to the multiple pressure generators, and each of the other multiple gas channels communicates with the gas channel.

8. A liquid discharge apparatus comprising the liquid discharge head according to claim 1.

9. A liquid discharge head comprising:

a nozzle plate including multiple nozzles from which a liquid is dischargeable in a discharge direction, the multiple nozzles arrayed in a nozzle array direction;

an individual channel member including individual channels respectively communicating with the multiple nozzles;

multiple pressure generators to generate pressure to discharge the liquid from the multiple nozzles, respectively;

a wiring member including a drive circuit to output a drive signal to each of the multiple pressure generators;

a protector adjacent to at least one side of the nozzle plate in a direction perpendicular to the discharge direction and overlapping the drive circuit of the wiring member in the discharge direction;

a housing holding the protector, the nozzle plate, and the individual channel member, the housing including:

a gas inlet; and a gas outlet; and a gas channel between the protector and the wiring member and communicating with each of the gas inlet and the gas outlet, wherein:

the protector includes a rib facing the wiring member.

10. The liquid discharge head according to claim 9, wherein:

the rib extends in a direction from the gas inlet to the gas outlet.

11. The liquid discharge head according to claim 9, wherein:

the nozzle plate includes silicon.

12. The liquid discharge head according to claim 9, wherein:

the protector is bonded to the housing and a cover of the housing using an epoxy-based adhesive.

13. The liquid discharge head according to claim 9, wherein:

a surface of the nozzle plate from which the liquid is discharged includes a liquid repellent film.

14. The liquid discharge head according to claim 9, wherein:

the individual channel member includes a diaphragm having a three-layer structure including a silicon oxide film, a silicon film, and a silicon oxide film.

15. A liquid discharge head comprising:

a nozzle plate including multiple nozzles from which a liquid is dischargeable in a discharge direction, the multiple nozzles arrayed in a nozzle array direction;

an individual channel member including individual channels respectively communicating with the multiple nozzles;

multiple pressure generators to generate pressure to discharge the liquid from the multiple nozzles, respectively;

a wiring member including a drive circuit to output a drive signal to each of the multiple pressure generators;

a protector adjacent to at least one side of the nozzle plate in a direction perpendicular to the discharge direction and overlapping the drive circuit of the wiring member in the discharge direction;

a housing holding the protector, the nozzle plate, and the individual channel member, the housing including:

a gas inlet; and a gas outlet; and a gas channel between the protector and the wiring member and communicating with each of the gas inlet and the gas outlet, wherein:

the individual channel member further includes other multiple gas channels to supply gas to the multiple pressure generators, and each of the other multiple gas channels communicates with the gas channel.

16. The liquid discharge head according to claim 15, wherein:

each of the multiple pressure generators includes a piezoelectric film including lead zirconate titanate (PZT).

17. The liquid discharge head according to claim 15, wherein:

the housing includes epoxy resin.

18. The liquid discharge head according to claim 15, wherein:

the protector includes epoxy resin.

19. The liquid discharge head according to claim 15, further comprising:

a sealing material filling a gap between the nozzle plate and the protector.

20. The liquid discharge head according to claim 15, wherein:

the wiring member is connected to the individual channel member using a non-conductive paste.

* * * * *